United States Patent
Lee et al.

(10) Patent No.: US 8,885,954 B2
(45) Date of Patent: Nov. 11, 2014

(54) MEMORY REDUCTION DEVICE OF STEREOSCOPIC IMAGE DISPLAY FOR COMPENSATING CROSSTALK

(71) Applicant: LG Display Co., Ltd., Seoul (KR)

(72) Inventors: Jeongki Lee, Paju-si (KR); Seungho Baek, Paju-si (KR); Jaewoo Park, Goyang-si (KR); Dongjun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 202 days.

(21) Appl. No.: 13/728,827

(22) Filed: Dec. 27, 2012

(65) Prior Publication Data

US 2014/0071120 A1 Mar. 13, 2014

(30) Foreign Application Priority Data

Sep. 12, 2012 (KR) .......................... 10-2012-0101164

(51) Int. Cl.
*G06K 9/36* (2006.01)
*G06T 15/00* (2011.01)
*H04N 13/00* (2006.01)

(52) U.S. Cl.
CPC .............. *G06T 15/005* (2013.01); *H04N 13/00* (2013.01)

USPC ........................................................ 382/232

(58) Field of Classification Search
None
See application file for complete search history.

(56) References Cited

FOREIGN PATENT DOCUMENTS

| KR | 10-2012-0064405 A | 6/2012 |
| KR | 10-2013-0005830 A | 1/2013 |
| KR | 10-2013-0017890 A | 2/2013 |
| KR | 10-2013-0124088 A | 11/2013 |

*Primary Examiner* — Stephen R Koziol
*Assistant Examiner* — Amandeep Saini
(74) *Attorney, Agent, or Firm* — Birch, Stewart, Kolasch & Birch, LLP

(57) ABSTRACT

A memory reduction device of a stereoscopic image display includes a compression unit configured to receive first to fourth input data belonging to Gn and comprised of K1 bit, respectively, align the first to fourth input data in order of a data size to generate first to fourth alignment data, generate first to fourth compression data groups including first and second compression data having K2 bits smaller than K1 bits and third compression data having K3 bits smaller than K2 bits based on the first to fourth alignment data, derive an outlier from the first to fourth input data by using a deviation between the first to fourth alignment data, select any one of the first to fourth compression data groups, as the compressed Gn-1 according to the presence or absence of the outlier and an outlier derivation position.

11 Claims, 13 Drawing Sheets

MEMORY REDUCTION DEVICE OF STEREOSCOPIC IMAGE DISPLAY FOR COMPENSATING CROSSTALK

This nonprovisional application claims priority under 35 U.S.C. §119(a) on Patent Application No. 10-2012-0101164 filed in Republic of Korea on Sep. 12, 2012, the entire contents of which are hereby incorporated by reference.

BACKGROUND

1. Field

This document relates to a memory reduction device of a stereoscopic image display for compensating for crosstalk.

2. Related Art

A stereoscopic image display implements a stereoscopic image, i.e., a three-dimensional (3D) image, by using a stereoscopic technique or an autostereoscopic technique. The stereoscopic technique, which uses parallax images of left and right eyes having great stereoscopic effect, includes glass type stereoscopic scheme and a non-glass type stereoscopic technique, both of which have been commercialized.

A glass type stereoscopic image display is divided into a polarization glass type stereoscopic image display and a shutter-glass type stereoscopic image display. The polarization glass type stereoscopic image display includes a polarization splitter, such as a patterned retarder, joined to a display panel. The patterned retarder splits polarized light of a left eye image and a right eye image displayed on the display panel. When enjoying (or viewing) a stereoscopic image through a polarization glass type stereoscopic image display, a viewer (or a user) wears polarization glasses to view polarized light of a left eye image through a left eye filter of the polarization glasses and polarized light of a right eye image through a right eye filter of the polarization glasses, obtaining a three-dimensional (3D) effect.

The shutter-glass type stereoscopic image display, without a polarization splitter attached to a display panel, alternately displays a left eye image and a right eye image on the display panel and opens a left eye shutter of shutter glasses such that it is synchronized with the left eye image and opens right eye shutter of the shutter glasses such that it is synchronized with the right eye image. When viewing a stereoscopic image through the shutter-glass type stereoscopic image display, a viewer wears shutter glasses to view polarized light of a left eye image through the left eye shutter of the shutter glasses and polarized light of a right eye image through the right eye shutter of the shutter glasses, obtaining a 3D effect.

Picture quality evaluation items of a stereoscopic image display include contrast, flicker, 3D crosstalk, and the like, and among them, 3D crosstalk is the biggest issue. 3D crosstalk is a phenomenon by which light (light leakage) of anther eye image is made incident to one eye (right eye or left eye) of a viewer to distort luminance of the one eye image. 3D crosstalk is severely appears in the shutter-glass type stereoscopic image display in which left eye images and right eye images are alternately displayed at certain timer intervals, but it is also problematic even with the polarization glass type stereoscopic image display in which left eye images and right eye images are simultaneously displayed separately by the line.

Recently, in order to compensate for 3D crosstalk, a technique of predicting a portion in which crosstalk is generated by comparing left eye and right eye images displayed to neighbor to each other temporally (or spatially), and modulating data of the predicted portion with a compensation value has been proposed by the applicant of this application. As illustrated in FIG. 1, this technique compensates for 3D crosstalk by using a crosstalk compensation unit 1 comparing Gn−1 to be displayed to neighbor to each other temporally (or spatially) and modulating Gn into Gn' and a memory 2 storing Gn−1 for a certain period of time. Gn, any one of left eye data and right eye data, indicates frame (or line) data to be displayed in nth frame (or nth horizontal pixel line), and Gn−1, the other of the left eye data and the right eye data, indicates frame (or line) data to be displayed in (n−1)th frame (or (n−1)th horizontal pixel line). The crosstalk compensation unit 1 is implemented as a look-up table from which the compensation value Gn' is read by using Gn and Gn−1 as read addresses.

In this case, however, in order to implement a 3D crosstalk compensation technique, a large capacity memory is required. When red data (R), green data (GL), and blue data (GL) for image implantation are comprised of 8 bits, respectively, an existing 3D crosstalk compensation technique requires a memory having a capacity of about (horizontal resolution*3*8*2) bits although it is applied to a polarization glass type. For example, in case of applying the existing 3D crosstalk compensation technique to a polarization glass-type stereoscopic image display implementing FHD resolution, a required capacity of a memory amounts to (1920*3*8*2=92160 bit)(=11.25 KByte). When the existing 3D crosstalk compensation technique is applied to the shutter-glass type stereoscopic image display, a required capacity of a memory is further increased.

SUMMARY

An aspect of the present invention provides a memory reduction device of a stereoscopic image display capable of reducing a capacity of a memory required for compensating for 3D crosstalk.

In an aspect, a memory reduction device of a stereoscopic image display for compensating for 3D crosstalk by comparing Gn and Gn−1 to be displayed to neighbor to each other and modulating Gn into Gn', comprises: a memory; and a compression unit configured to receive first to fourth input data belonging to Gn and comprised of K1 bit, respectively, align the first to fourth input data in order of a data size to generate first to fourth alignment data, generate first to fourth compression data groups including first and second compression data having K2 bits smaller than the K1 bits and third compression data having K3 bits smaller than the K2 bits based on the first to fourth alignment data, derive an outlier from the first to fourth input data by using a deviation between the first to fourth alignment data, select any one of the first to fourth compression data groups, as a compressed Gn−1 according to the presence or absence of the outlier and an outlier derivation position, and store the same in the memory.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

In the drawings.

DETAILED DESCRIPTION

Figure 1:
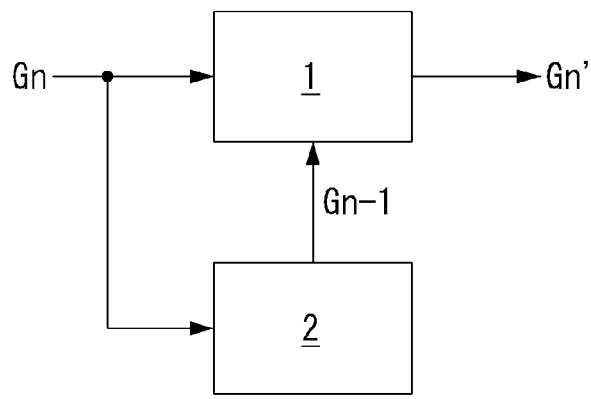
FIG. 1 is a view schematically illustrating an existing 3D crosstalk compensation technique.

Hereinafter, embodiments will be described in detail with reference to the accompanying drawings. Throughout the specification, the like reference numerals denote the substantially same elements. In describing the present invention, if a detailed explanation for a related known function or construction is considered to unnecessarily divert the gist of the present invention, such explanation will be omitted but would be understood by those skilled in the art. Names of elements used in the following description are selected for the description purpose and may be different from those of actual products.

Figure 3:
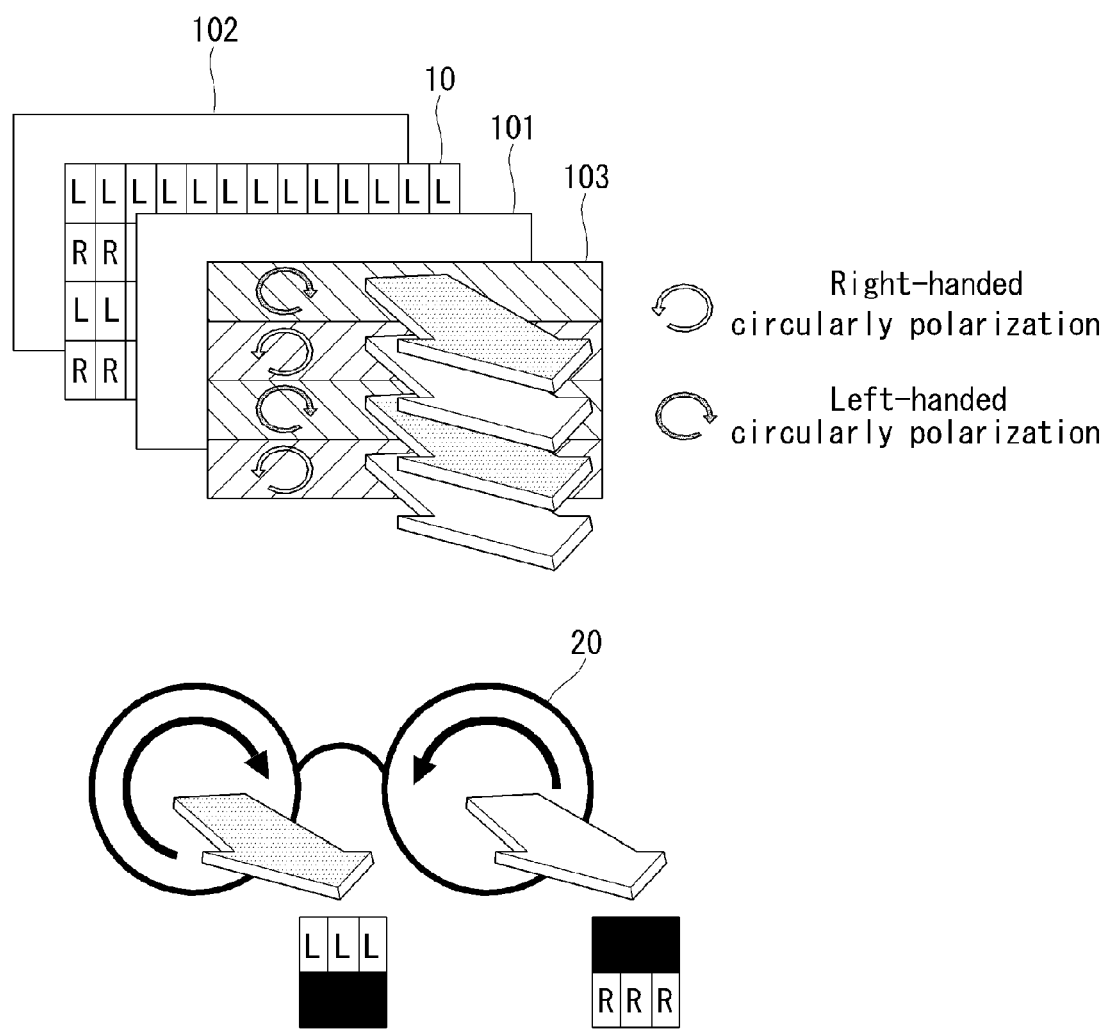
FIG. 3 is a detailed view illustrating an operation of a display panel, a pattered retarder, and polarization glasses when the stereoscopic image display of FIG. 2 is implemented as a polarization glass type stereoscopic image display.
Figure 4:
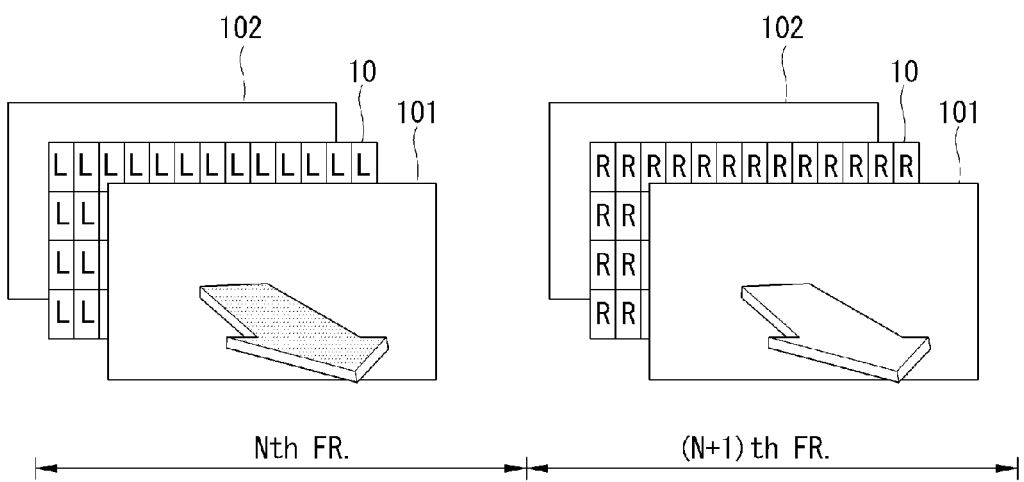
FIG. 4 is a detailed view illustrating an operation of the display panel and shutter glasses when the stereoscopic image display of FIG. 2 is implemented as a shutter-glass type stereoscopic image display.
Figure 4:
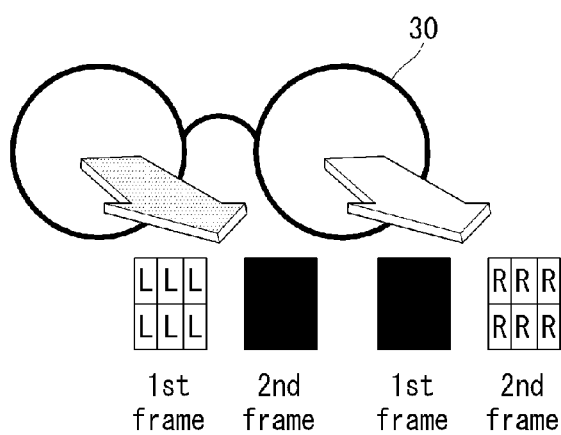

A memory reduction device of a stereoscopic image display according to an embodiment of the present invention may be applied to every scheme of compensating for 3D crosstalk by utilizing a memory in a stereoscopic image display expressing a stereoscopic image by splitting a left eye image and a right eye image through space division or time division. In the embodiment with respect to the memory reduction device of a stereoscopic image display according to the present invention, a glass type stereoscopic image display will be described as an example, but the present invention may also be applicable to a non-glass type stereoscopic image display that compensates for 3D crosstalk by utilizing a memory, without a great modification. Thus, it should be appreciated that the memory reduction device of a stereoscopic image display according to an embodiment of the present invention is not limited to a glass type stereoscopic image display. A glass type stereoscopic display device is classified into a polarization-glass type stereoscopic image display as illustrated in FIG. 3 and a shutter-glass type stereoscopic image display as illustrated in FIG. 4.

Figure 2:
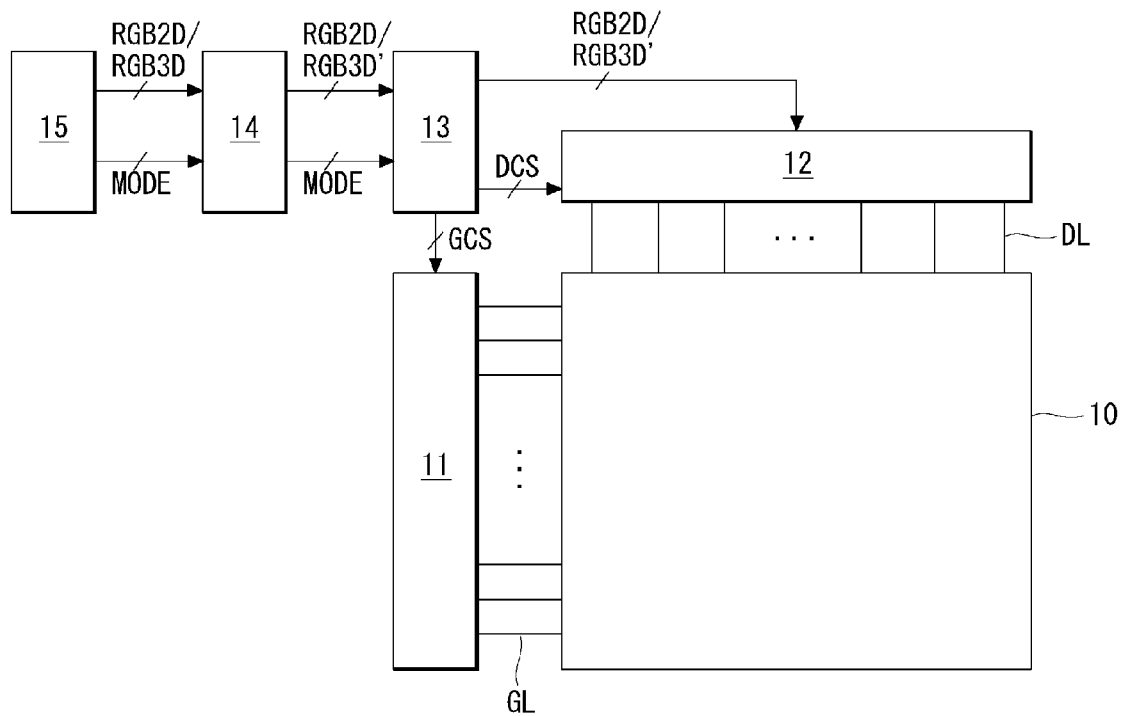
FIG. 2 is a block diagram of a stereoscopic image display according to an embodiment of the present invention.

FIG. 2 is a block diagram of a stereoscopic image display according to an embodiment of the present invention. FIG. 3 is a detailed view illustrating an operation of a display panel, a patterned retarder, and polarization glasses when the stereoscopic image display of FIG. 2 is implemented as a polarization glass type stereoscopic image display. FIG. 4 is a detailed view illustrating an operation of the display panel and shutter glasses when the stereoscopic image display of FIG. 2 is implemented as a shutter-glass type stereoscopic image display.

In the embodiment described hereinafter, a stereoscopic image display implemented as a liquid crystal display (LCD) will be largely described, but it should be appreciated that the technical concept of the present invention is not limited thereto. The stereoscopic image display according to an embodiment of the present invention may be implemented as a flat panel display (FPD) such as a liquid crystal display (LCD), a field emission display (FED), a plasma display panel (PDP), an organic light emitting diode (OLED), or the like.

Referring to FIG. 2, the stereoscopic image display according to an embodiment of the present invention includes a display panel 10, a gate driving circuit 11, a data driving circuit 12, a timing controller 13, a data modulation circuit 14, a host system 15, and the like.

The display panel 10 includes an upper substrate and a lower substrate facing with a liquid crystal layer interposed therebetween. A pixel array including liquid crystal cells arranged in a matrix form by a crossing structure of data lines DL and gate lines GL (or scan lines) is formed on the display panel 10. The liquid crystal cells of the pixel array display an image by adjusting a transmission amount of light by driving liquid crystal of the liquid crystal layer by a voltage difference between a pixel electrode in which a data voltage is charged and a common electrode to which a common voltage is applied through the TFTs, respectively.

Black matrices and color filters are formed on an upper substrate of the display panel 10. In case of a vertical electric field driving method (or a vertical field switching mode) such as a twisted nematic (TN) mode or a vertical alignment (VA) mode, the common electrode is formed on the upper substrate, and in case of a horizontal electric field driving method such as an in-plane switching (IPS) mode or a fringe field switching (FFS) mode, the common electrode is formed together with the pixel electrode on the lower substrate. A liquid crystal mode of the display panel 10 may be implemented as any liquid crystal mode, as well as as the TN mode, the VA mode, the IPS mode, or the FFS mode. The display panel 10 may be implemented in any form of a transmissive liquid crystal display panel, a transflective liquid crystal display panel, a reflective liquid crystal display panel, or the like. The transmissive liquid crystal display panel and the transflective liquid crystal display panel require a backlight unit. A backlight unit may be implemented as a direct type backlight unit or an edge type backlight unit. An upper polarization film is attached to the upper substrate of the display panel 10, and a lower polarization film is attached to the lower substrate of the display panel 10. An alignment film for setting a pre-tilt angle of liquid crystal is formed on the upper substrate and the lower substrate. A spacer for maintaining a cell gap of the liquid crystal is formed between the upper substrate and the lower substrate of the display panel 10.

The gate driving circuit 11 sequentially supplies gate pulses to the gate lines GL of the display panel 10 under the control of the timing controller 13. The data driving circuit 12 converts 2D video data RGB2D or modulated 3D video data RGB3D' into a positive polarity/negative polarity gamma compensation voltage to generate positive polarity/negative polarity analog data voltages under the control of the timing controller 13. The positive polarity/negative polarity analog data voltages output from the data driving circuit 12 are supplied to the data lines DL of the display panel 10.

The timing controller 13 receives the 2D video data RGB2D or 3D video data RGB3D' modulated for crosstalk compensation, timing signals, a mode signal MODE, and the like, from the data modulation circuit 14. The timing signals include a vertical synchronization signal, a horizontal synchronization signal, a data enable signal, a clock signal, and the like. The mode signal MODE is a signal indicating a 2D mode or a 3D mode. Based on the 2D video data RGB2D or the modulated 3D image data RGB3D', the timing signals, and the mode signal MODE, the timing controller 13 generates a gate control signal GCS for controlling the gate driving circuit 11 and a data control signal DCS for controlling the data driving circuit 12. The timing controller 13 supplies the gate control signal GCS to the gate driving circuit 11. The timing controller 13 supplies the 2D video data RGB2D or the modulated 3D video data RGB3D' and the data control signal DCS to the data driving circuit 12.

The host system 15 may be implemented in the form of a system on chip (SoC) including a scaler for converting the 2D video data RGB2D or the 3D video data RGB3D input from an external video source device into a data format appropriate for resolution of the display panel 10. Also, the host system 15 may include a 3D formatter for converting 3D video data RGB3D into a 3D format fitting a time division scheme or a space division scheme in a 3D mode. The host system 15 supplies 2D video data RGB2D or 3D video data RGB3D to the data modulation circuit 14 through an interface such as a low voltage differential scaling (LVDS) interface, a transition minimized differential signaling (TMDS) interface, or the like. Also, the host system 15 supplies the timing signals, the mode signal MOD, and the like, to the data modulation circuit 14.

The data modulation circuit 14 bypasses the 2D video data RGB2D to the timing controller 13 in a 2D mode, rather than modulating it. The data modulation circuit 14 receives the 3D video data RGB3D in the 3D mode. The data modulation circuit 14 predicts a portion having 3D crosstalk by comparing a left eye image and a right eye image displayed to be adjacent temporally (or spatially), and modulates data of the predicted portion with a compensation value, and outputs the modulated 3D video data RGB3D'. The data modulation circuit 14, including a memory for storing the 3D video data RGB3D for a certain period of time and a compression unit and a restoration unit for reducing a capacity of the memory, significantly reduces the capacity of the memory required for 3D crosstalk compensation. A memory reduction device belonging to the data modulation circuit 14 will be described in detail with reference to FIGS. 5 to 16 later.

When the stereoscopic image display of FIG. 2 is implemented as a polarization glass type stereoscopic image display, the stereoscopic image display further includes a patterned retarder 103 and polarization glasses 20 as illustrated in FIG. 3. The display panel 10 displays a left eye image L (or a right eye image) in odd-number horizontal pixel lines and displays a right eye image R (or a left eye image) in even-number horizontal pixel lines. An image displayed in the pixels of the display panel 10 is made incident to the patterned retarder 103 disposed on the display panel 10 through an upper polarization film 101

The patterned retarder 103 includes a first retarder pattern facing the odd-number horizontal pixel lines and a second retarder pattern facing the even-number horizontal pixel lines. The first retarder pattern converts light made incident from the display panel 10 into first circular polarization (left circular polarization). The second retarder pattern converts light made incident from the display panel 10 into second circular polarization (right circular polarization). The polarization glasses 20 includes a left eye polarization filter allowing the first circular polarization converted by the first retarder pattern to pass therethrough and a right eye polarization filter allowing the second circular polarization converted by the second retarder pattern to pass therethrough. For example, the left eye polarization filter may make left circular polarization pass therethrough and the right eye polarization filter may make right circular polarization pass therethrough.

When the polarization glass type stereoscopic image display operates in the 3D mode, the left eye image L displayed in the odd-number horizontal pixel lines of the display panel 10 is converted into first circular polarization by the first retarder pattern and the right eye image R displayed in the even-number horizontal pixel lines of the display panel 10 is converted into second circular polarization by the second retarder pattern. The first circular polarization reaches the user's left eye, after passing through the left eye polarization filter of the polarization glasses 20, and the second circular polarization reaches the user's right eye, after passing through the right eye polarization filter. Thus, the user views only the left eye image L through his left eye and only the right eye image R through his right eye, obtaining a three-dimensional (3D) effect from binocular disparity.

When the stereoscopic image display of FIG. 2 is implemented as a shutter-glass type stereoscopic image display, the stereoscopic image display further includes shutter glasses 30 as illustrated in FIG. 4.

The host system 15 may output a shutter control signal to open and close a left eye shutter and a right eye shutter of the shutter glasses 30. The shutter control signal is transmitted to a shutter control signal reception unit through a wired/wireless interface. The shutter control signal reception unit may be installed in the shutter glasses 30 or may be fabricated as a separate module and detachably attached to the shutter glasses 30.

The shutter glasses 30 include a left eye shutter and a right eye shutter which are electrically separately controlled. The left eye shutter and the right eye shutter include a birefringent medium for adjusting light transmittance to transmit and block light. The left eye shutter and the right eye shutter may include a first transparent substrate, a first transparent electrode formed on the first transparent substrate, a second transparent substrate, a second transparent electrode formed on the second transparent substrate, and a liquid crystal layer interposed between the first and second transparent substrates, respectively. A reference voltage is supplied to the first transparent electrode, and an ON/OFF voltage is supplied to the second transparent electrode. When the ON voltage is applied to the second transparent electrode, the left eye shutter and the right eye shutter transmit incident light to a viewer's eyes, and when the OFF voltage is applied to the second transparent electrode, the left eye shutter and the right eye shutter block light transmission to the viewer's eyes.

When the shutter glass type stereoscopic image display operates in the 3D mode, the left eye image L and the right eye image R are alternately displayed on the display panel 10 at certain time intervals (e.g., frames) as illustrated in FIG. 4. The shutter glasses 30 open only the left eye shutter during nth frame period (Nth FR.) in which the left eye image L is displayed on the display panel 10, and open only the right eye shutter during (n+)th frame period ((N+1)th FR.) in which the right eye image R is displayed on the display panel 10. Thus, the user views only the left eye image L through his left eye and only the right eye image R through his right eye, obtaining a three-dimensional (3D) effect from binocular disparity.

Figure 5:
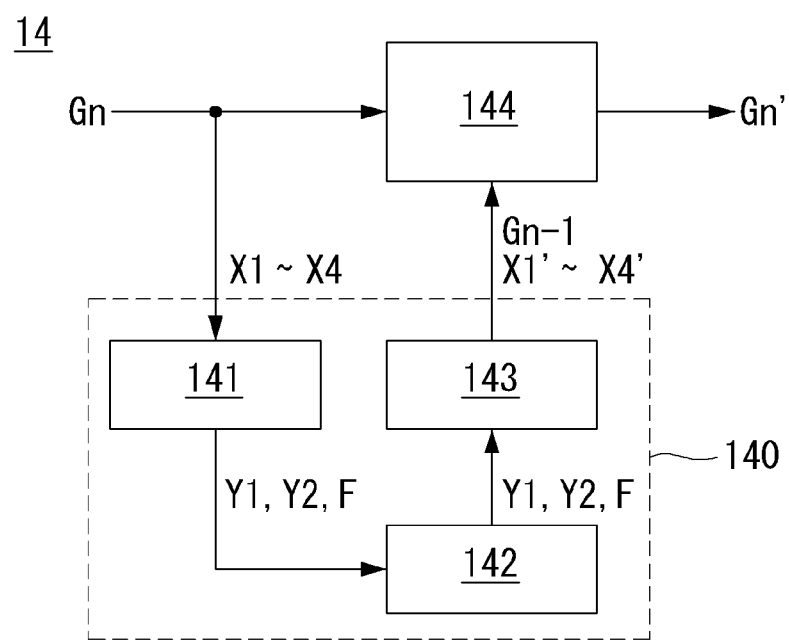
FIG. 5 is a view illustrating a data modulation circuit illustrated in FIG. 2.
Figure 6:
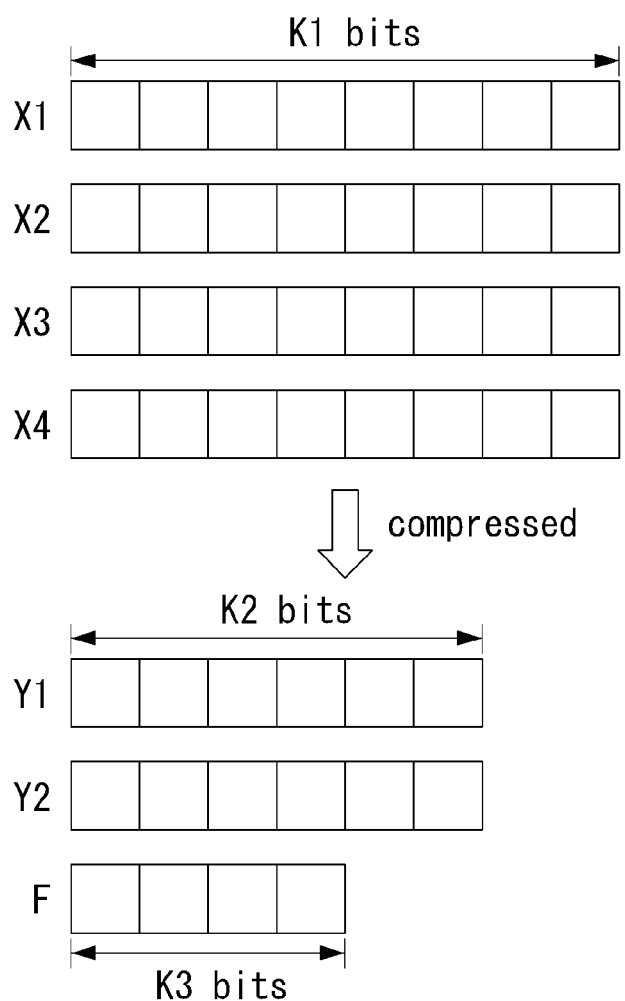
FIG. 6 is a view illustrating a capacity of data before and after compression.
Figure 7:
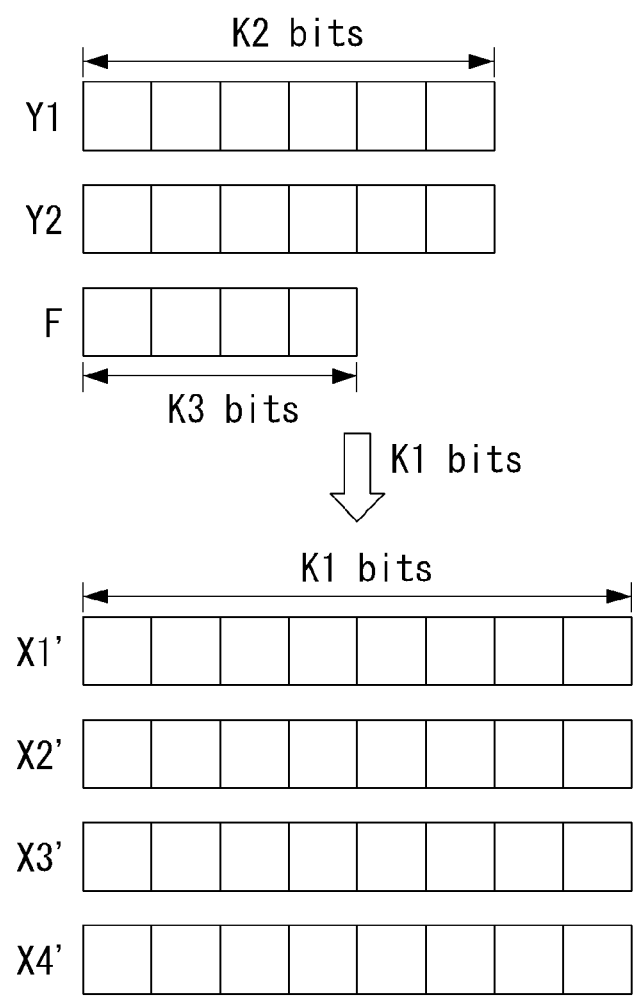
FIG. 7 is a view illustrating a capacity of data before and after restoration.

FIG. 5 is a view illustrating a data modulation circuit illustrated in FIG. 2. FIG. 6 is a view illustrating a capacity of data before and after compression. FIG. 7 is a view illustrating a capacity of data before and after restoration.

Referring to FIG. 5, the data modulation circuit 14 compensates for 3D crosstalk by using a crosstalk compensation unit 144 for comparing Gn and Gn−1 to be displayed to be adjacent temporally (or spatially) and modulating Gn into Gn' and a memory 142 storing Gn−1 for a certain period of time. Gn is any one of left eye data and right eye data, indicating frame (or line) data of a 3D Image to be displayed in nth frame (or nth horizontal pixel line) and Gn−1 is the other of the left eye data and the right eye data, indicating frame (or line) data of a 3D image to be displayed in (n−1)th frame (or (n−1)th horizontal pixel line). The crosstalk compensation unit 144 may include a look-up table for reading a compensation value Gn' by using Gn and Gn−1 as read addresses and outputting a modulated 3D video data RFG3D'.

The crosstalk compensation unit 144 has the substantially same function as that of data modulation units respectively disclosed in Korean Patent Application No. 10-2012-0047716 (May 4, 2012), Korean Patent Application No. 10-2011-0067467 (Jul. 7, 2011), and Korean Patent Application No. 10-2010-0125622 (Dec. 10, 2010) filed by the applicant of the present invention. Also, the crosstalk compensation unit 144 may be replaced by a viewing angle compensation circuit disclosed in Korean Patent Application No. 10-2011-0080600 (Aug. 12, 2011) filed by the applicant of the present invention.

The data modulation circuit 14 includes a compression unit 141 for compressing data to be stored in the memory 142 to reduce a capacity of the memory 142. The compression data stored in the memory 142 is restored to have the original size through a restoration unit 143. In FIG. 5, a memory reduction device 140 includes only the compression unit 141 and the memory 142 in a narrow sense and includes up to the restoration unit 143 in a broad sense.

The compression unit 141 receives first to fourth input data X1~X4 belonging to Gn and comprised of K1 bits, respectively. The compression unit 141 aligns the first to fourth data X1~X4 in order of a data size to generate first to fourth alignment data, and subsequently generates four compression data groups. Each of the four compression data groups include first and second compression data (Y1 and Y2) having K2 bits smaller than K1 bits and third compression data F having K3 bits smaller than K2 bits based on the first to fourth alignment data as illustrated in FIG. 6. Thereafter, the compression unit 141 derives an outlier from the first to fourth input data X1~X4 by using a deviation between the first to fourth alignment data, and supplies any one of the four compression data groups according to the presence or absence of the outlier and an outlier derivation position to the memory 142. Here, the outlier is defined as data having a value different by more than a predetermined value based on an average value of the first to fourth alignment data. The outlier may be determined at least one of the first to fourth alignment data. As illustrated in FIG. 6, the capacity of the compression data groups Y1, Y2, and F stored in the memory 142 is significantly reduced relative to the total capacity of the first to fourth input data X1~X4.

The number of bits of the third compression data F is set to be equal to the number of (i.e., four) input data considered for compression. The third compression data F indicates the presence and absence of an outlier and a position of data corresponding to the outlier. When there is no outlier in the first to fourth input data X1~X4, the most significant K2 bits of the average value of the first to fourth input data X1~X4 are allocated to the first compression data Y1, least significant (K1-K2) bits of the average value of the first to fourth input data X1~X4 are allocated to least significant bits of the second compression data Y2, and 0 indicating that there is no outlier in every bit is allocated to the third compression data F. When there is an outlier in the first to fourth input data X1~X4, an average value of input data, excluding the outlier, among the first to fourth input data X1~X4 is allocated to the first compression data Y1, an average value of input data corresponding to the outlier is allocated to the second compression data Y2, and '1' is allocated to the third compression data F according to a position of the outlier, and 0 is allocated to the third compression data F according to a position of a non-outlier.

The restoration unit 143 receives the compression data groups Y1, Y2, and F. The restoration unit 143 restores the compression data groups Y1, Y2, and F into the first to fourth restoration data X1'~X4' comprised of K1 bits, respectively, according to the presence and absence of an outlier and an outlier derivation position. The restoration unit 143 supplies the first to fourth restoration data X1'~X4' belonging to Gn−1 to the crosstalk compensation unit 144. The first to fourth restoration data X1'~X4' are slightly different from the first to fourth input data X1~X4. In case of 3D crosstalk compensation, importance of least significant bits and importance of edge information do not have much importance, so a lossy compression and lossy restoration count little or nothing.

In the following description of an embodiment of the present invention, it is assumed that first to fourth input data X1~X$ and first to fourth restoration data X1'~X4' have 8 bits, first and second compression data have 6 bits, and third compression data has 4 bits. In this case, when the 3D crosstalk compensation technique is applied to the polarization glass type stereoscopic image display implementing FHD resolution, a required capacity of a memory is 5.625 Kbyte, equivalent to 50% of the existing capacity (11.25 Kbyte) of the memory.

Figure 8:
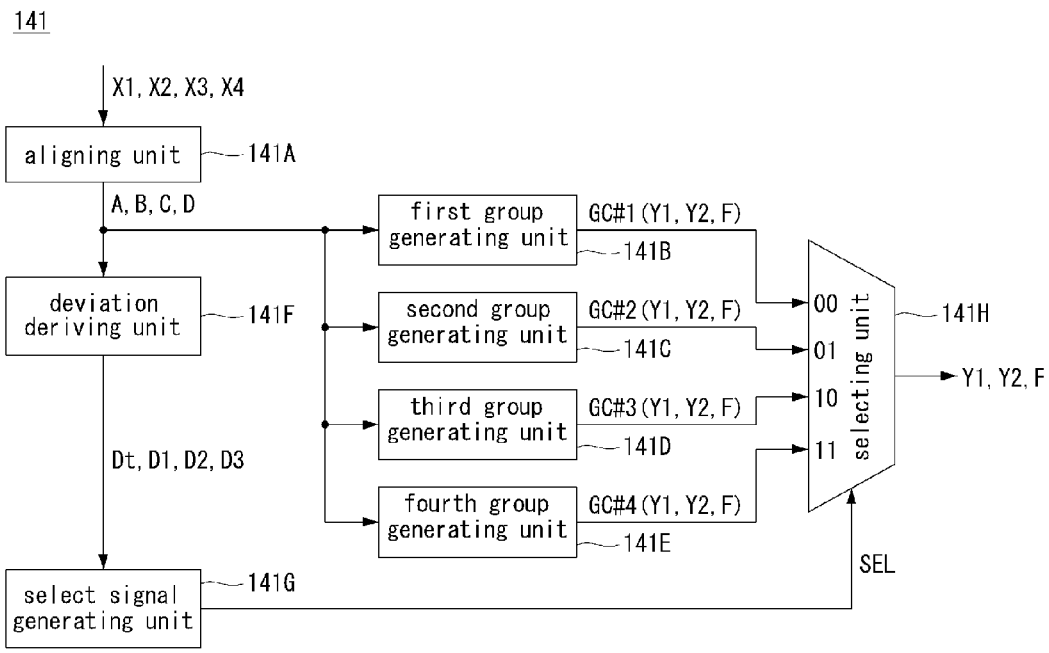
FIG. 8 is a view illustrating a detailed configuration of a compression unit of FIG. 5.
Figure 9:
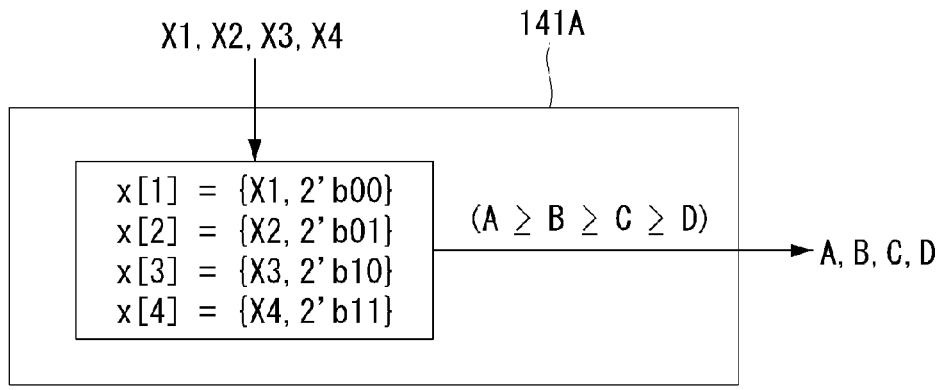
FIG. 9 is a view illustrating an operation of an aligning unit of FIG. 8.
Figure 14:
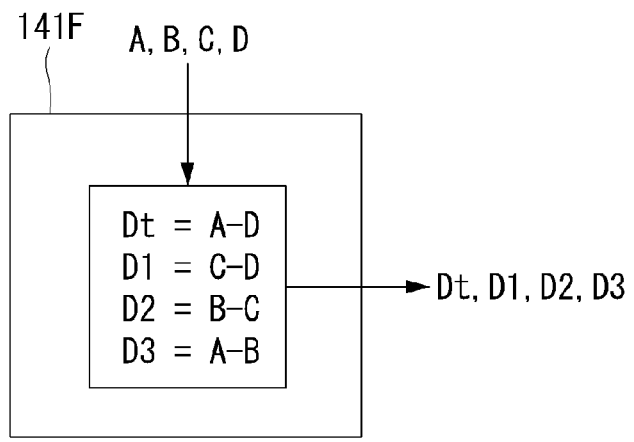
FIG. 14 is a view illustrating an operation of a deviation driving unit of FIG. 8.
Figure 15:
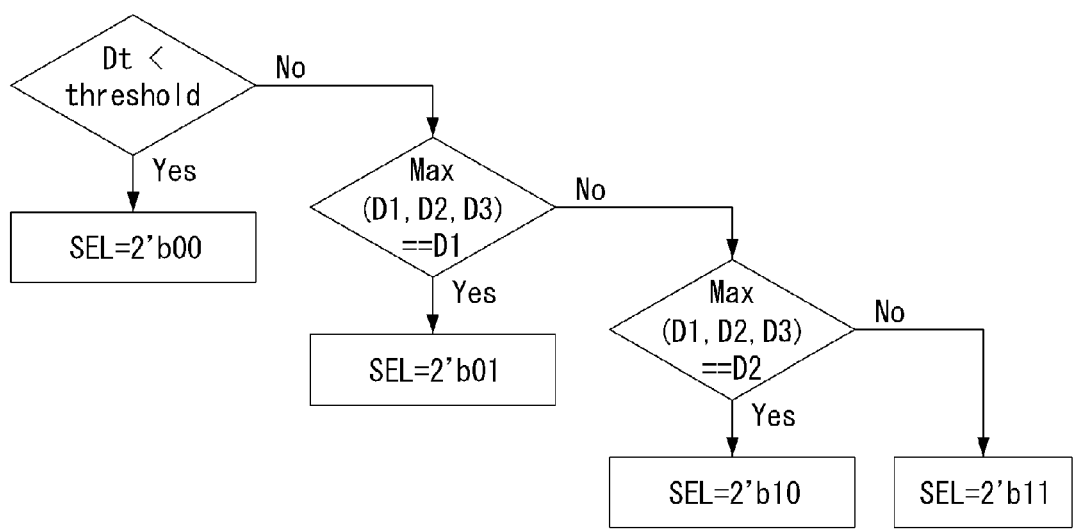
FIG. 15 is a view illustrating an operation of a select signal generating unit of FIG. 8.

FIG. 8 is a view illustrating a detailed configuration of a compression unit of FIG. 5. FIG. 9 is a view illustrating an operation of an aligning unit of FIG. 8. FIGS. 10 to 13 are views illustrating respective operations of first to fourth group generating units of FIG. 8. FIG. 14 is a view illustrating an operation of a deviation driving unit of FIG. 8. FIG. 15 is a view illustrating an operation of a select signal generating unit of FIG. 8. In the following description, 2'b00, 2'b01, 2'b10, 2'b11 represent binary numbers '00', '01', '10', '11' comprised of 2 bits, respectively, and 4'b0000, 4'b0010, 4'b0100, 4'b1000 represent '0001', '0010', '0100', '1000' comprised of 4 bits, respectively. And, [a:b] represents a number of data bits from a-th bit to b-th bit (b<a).

Referring to FIG. 8, the compression unit 141 includes an aligning unit 141A, first to fourth group generating units 141B, 141C, 141D, and 141E, a deviation deriving unit 141F, a select signal generating unit 141G, and a selecting unit 141H.

As illustrated in FIG. 9, the aligning unit 141A adds binary numbers '00', '01', '10', '11' comprised of 2 bits to the 8-bit first to fourth input data X1~X4, respectively, to generate 10-bit x[1],x[2],x[3],x[4]. x[1],x[2],x[3],x[4] include original position information together with data values of the first to fourth input data X1~X4, respectively. The aligning unit 141A sorts x[1],x[2],x[3],x[4] in order of a data size by using a known sorting algorithm such as selection soft, bubble sort, insertion sort, and the like, to generate 10-bit first to fourth sort data A, B, C, and D. The first to fourth alignment data are aligned in order of A≥B≥C≥D.

Figure 10:
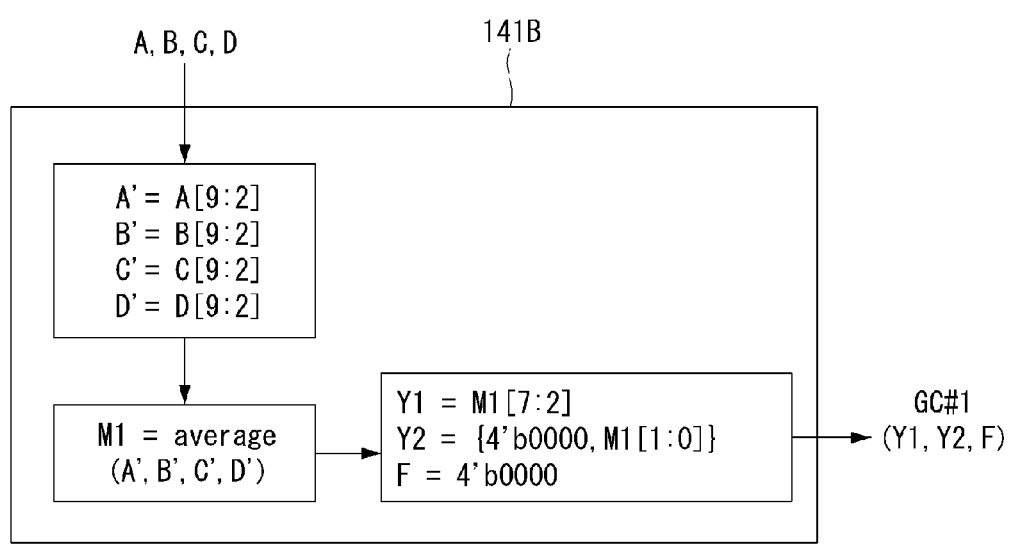
FIGS. 10 to 13 are views illustrating respective operations of first to fourth group generating units of FIG. 8.

The first group generating unit 141B generates a first compression data group GC#1 including 6-bit first compression data Y1, 6-bit second compression data Y2, and 4-bit third compression data F based on the 10-bit first to fourth alignment data A, B, C, and D as illustrated in FIG. 10. The first compression data group GC#1 corresponds to a data group in which an outlier does not exist. The first group generating unit 141B generates 8-bit first to fourth corrected alignment data A', B', C', and D' excluding least significant 2 bits in the 10-bit first to fourth alignment data A, B, C, and D. Here, the 8-bit first to fourth corrected alignment data A', B', C', and D' individually correspond to any one of the 8-bit first to fourth input data X1~X4, respectively. The first group generating unit 141B averages the 8-bit first to fourth corrected alignment data A', B', C', and D' to calculate 8-bit first average data M1. The first group generating unit 141B allocates most significant 6 bits M1[7:2] of the 8-bit first average data M1 to the first compression data Y1. The first group generating unit 141B allocates least significant 2 bits M1[1:0] of the 8-bit first average data M1 to least significant 2 bits of the second compression data Y2, and fills upper 4 bits of the second compression data Y2 with '0000'. The first group generating unit 141B allocates '0000' to the 4-bit third compression data F.

Figure 11:
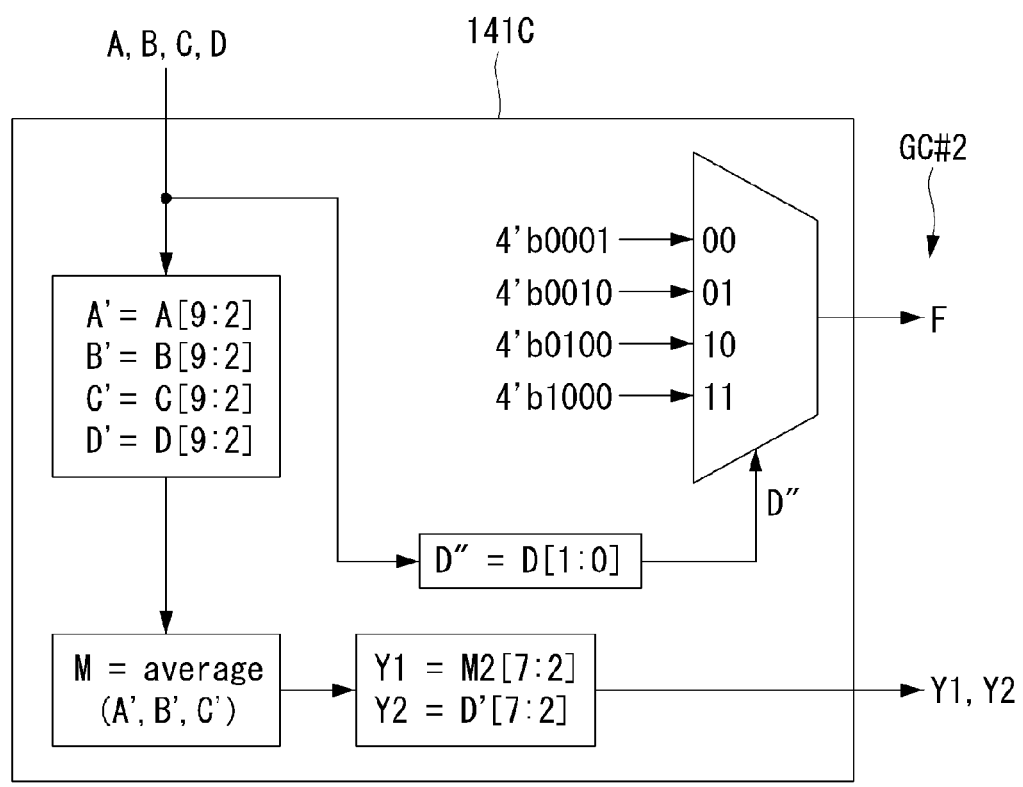

As illustrated in FIG. 11, the second group generating unit 141C generates a second compression data group GC#2 including 6-bit first compression data Y1, 6-bit second compression data Y2, and 4-bit third compression data F based on the 10-bit first to fourth alignment data A, B, C, and D. The second compression data group GC#2 corresponds to a data group in which an outlier exists in a first position (e.g., when D is an outlier). The second group generating unit 141C generates 8-bit first to fourth corrected alignment data A', B', C', and D' excluding least significant 2 bits in the 10-bit first to fourth alignment data A, B, C, and D. The second group generating unit 141C averages the 8-bit first to third corrected alignment data A', B', and C' to calculate 8-bit second average data M2. The second group generating unit 141C allocates most significant 6 bits M1[7:2] of the 8-bit second average data M2 to the first compression data Y1. The second group generating unit 141C allocates most significant 6 bits D'[7:2] of the 8-bit fourth corrected alignment data D' to the second compression data Y2. Also, the second group generating unit 141C allocates any one of '0001', '0010', '0100', and '1000' to the 4-bit third compression data F according to which of the first to fourth input data X1~X4 the 8-bit fourth corrected alignment data D' corresponds to. The second group generating unit 141C may know which of the first to fourth input data X1~X4 the fourth corrected alignment data D' corresponds to according to position information D" indicated in the least significant 2 bits D[1:0] of the fourth alignment data D.

Figure 12:
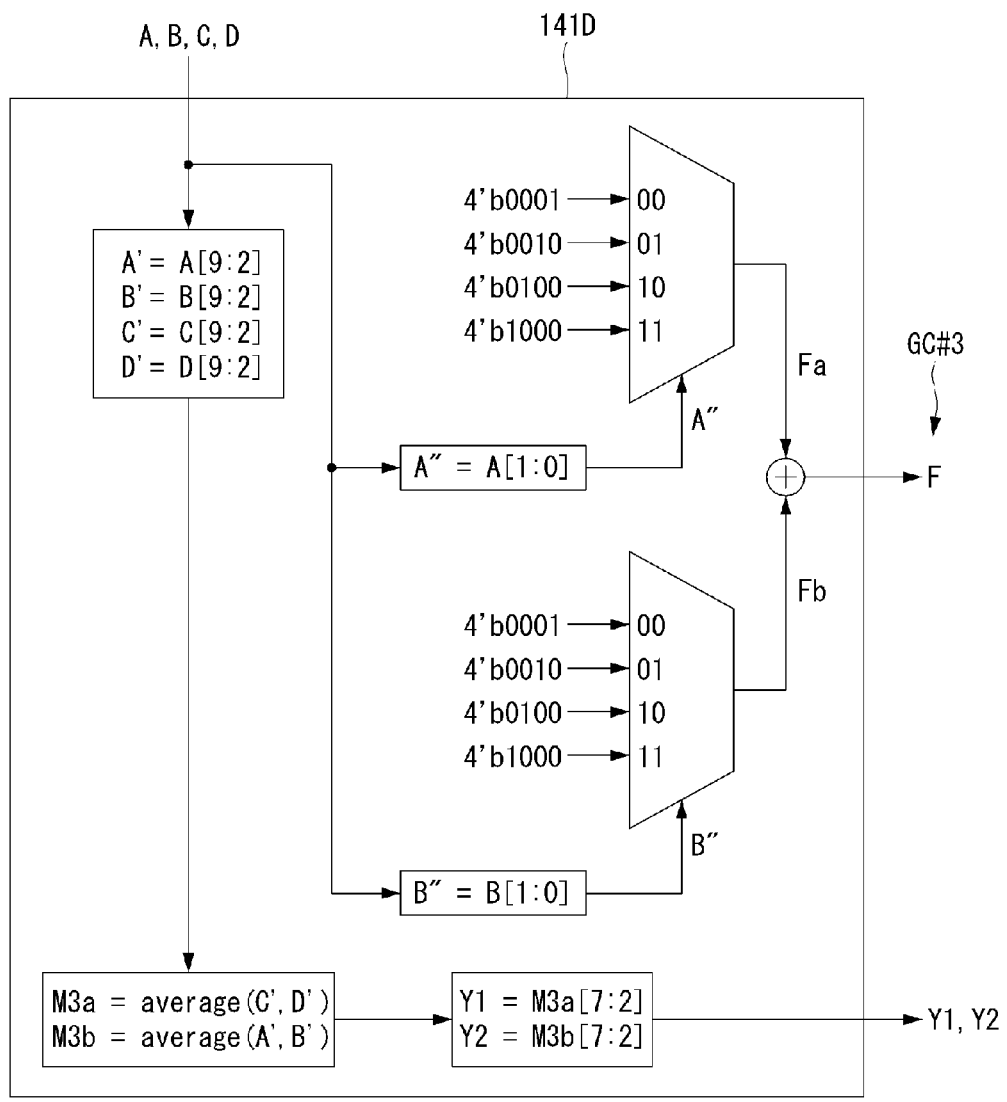

As illustrated in FIG. 12, the third group generating unit 141D generates a third compression data group GC#3 including 6-bit first compression data Y1, 6-bit second compression data Y2, and 4-bit third compression data F based on the 10-bit first to fourth alignment data A, B, C, and D. The third compression data group GC#3 corresponds to a data group in which an outlier exists in a second position (e.g., when A and B are outliers). The third group generating unit 141D generates 8-bit first to fourth corrected alignment data A', B', C', and D' excluding least significant 2 bits in the 10-bit first to fourth alignment data A, B, C, and D. The third group generating unit 141D averages the 8-bit third and fourth corrected alignment data C' and D' to calculate 8-bit 3a-th average data M3a and subsequently allocates most significant 6 bits M3a[7:2] of the 8-bit 3a-th average data M3a to the first compression data Y1. The third group generating unit 141D averages the 8-bit first and second corrected alignment data A' and B' to calculate 8-bit 3b-th average data M3b and subsequently allocates most significant 6 bits M3b[7:2] of the 8-bit 3b-th average data M3b to the second compression data Y2. The third group generating unit 141D selects mutually different two (Fa and Fb) from among '0001', '0010', '0100', and '1000' according to which of the 8-bit first to fourth input data X1~X4 the 8-bit first and second corrected alignment data A' and B' individually correspond to, adds up the selected two (Fa and Fb), and allocates the same to the 4-bit third compression data F. The third group generating unit 141D may know which of the first to fourth input data X1~X4 the first corrected alignment data A' corresponds to according to position information A" indicated in the least significant 2 bits A[1:0] of the first alignment data A, and also know which of the first to fourth input data X1~X4 the second corrected alignment data B' corresponds to according to position information B" indicated in the least significant 2 bits B[1:0] of the second alignment data B.

Figure 13:
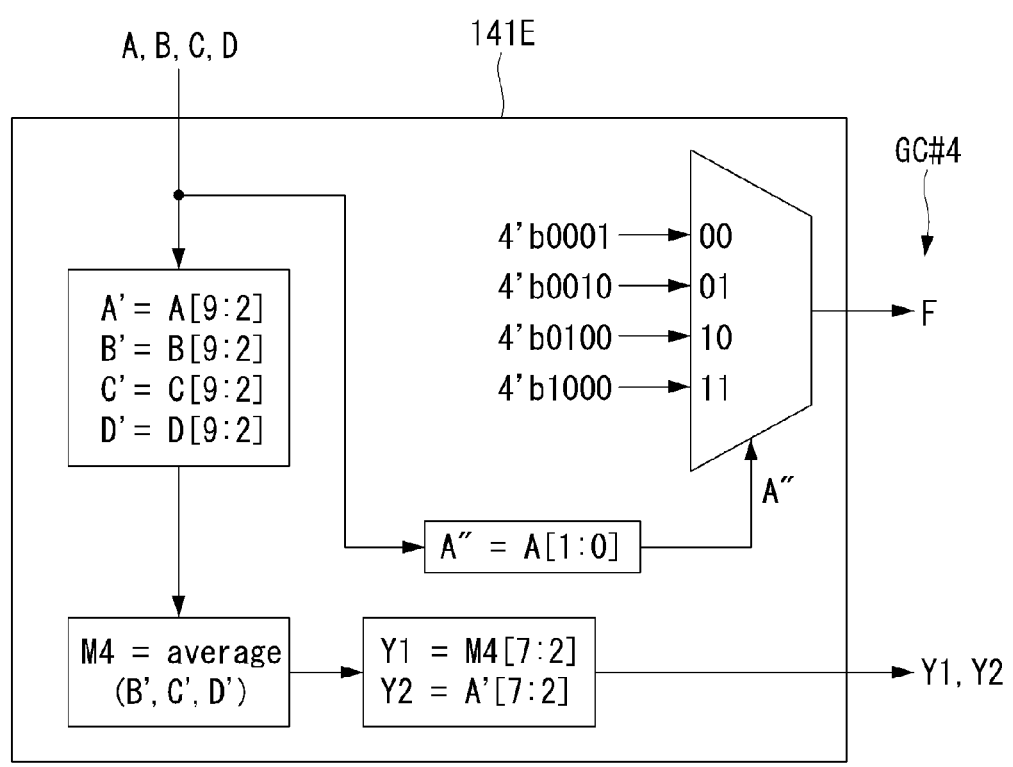

As illustrated in FIG. 13, the fourth group generating unit 141E generates a fourth compression data group GC#4 including 6-bit first compression data Y1, 6-bit second compression data Y2, and 4-bit third compression data F based on the 10-bit first to fourth alignment data A, B, C, and D. The fourth compression data group GC#4 corresponds to a data group in which an outlier exists in a third position (e.g., when A is an outlier). The fourth group generating unit 141E generates 8-bit first to fourth corrected alignment data A', B', C', and D' excluding least significant 2 bits in the 10-bit first to fourth alignment data A, B, C, and D. The fourth group generating unit 141E averages the 8-bit second to fourth corrected alignment data B', C', and D' to calculate 8-bit fourth average data M4. The fourth group generating unit 141E allocates most significant 6 bits M4[7:2] of the 8-bit fourth average data M4 to the first compression data Y1. The fourth group generating unit 141E allocates most significant 6 bits A'[7:2] of the 8-bit first corrected alignment data A' to the second compression data Y2. The fourth group generating unit 141E allocates any one of '0001', '0010', '0100', and '1000' to the third compression data F according to which of the 8-bit first to fourth input data X1~X4 the 8-bit first corrected alignment data A' corresponds to. The fourth group generating unit 141E may know which of the first to fourth input data X1~X4 the first corrected alignment data A' corresponds to according to position information A" indicated in the least significant 2 bits A[1:0] of the first alignment data A.

The deviation deriving unit 141F calculates a maximum deviation Dt and first to third deviations D1, D2, and D3 through arithmetic operation with respect to the first to fourth 10-bit alignment data A, B, C, and D as illustrated in FIG. 14. The maximum deviation Dt is a deviation between the first and fourth alignment data A and D, the first deviation D1 is a deviation (C-D) between the third and fourth alignment data C and D, the second deviation D2 is a deviation (B-C) between the second and third alignment data B and C, and the third deviation D3 is a deviation (A-B) between the first and second alignment data A and B.

As illustrated in FIG. 15, the select signal generating unit 141G derives an outlier from the first to fourth alignment data A, B, C, and D by using deviations Dt and D1 to D3 supplied from the deviation deriving unit 141F, and outputs a different select signal SEL according to the presence and absence of an outlier and an outlier derivation position. When the maximum deviation Dt is smaller than a predetermined threshold value, the select signal generating unit 141G determines that there is no outlier, and outputs a select signal '00'. When the first deviation D1 among the first to third deviations D1, D2, and D3 is the greatest in a state in which the maximum deviation Dt is greater than the predetermined threshold value, the select signal generating unit 141G determines that the fourth alignment data D is an outlier, and outputs a select signal '01'. When the second deviation D2 among the first to third deviations D1, D2, and D3 is the greatest in a state in which the maximum deviation Dt is greater than the predetermined threshold value, the select signal generating unit 141G determines that the first and second alignment data A and B are outliers (or may determined that the third and fourth alignment data C and D are outliers), and outputs a select signal '10'. When the third deviation D3 among the first to third deviations D1, D2, and D3 is the greatest in a state in which the maximum deviation Dt is greater than the predetermined threshold value, the select signal generating unit 141G determines that the first alignment data A is an outlier, and outputs a select signal '11'.

In response to the select signal '00', the selecting unit 141H stores the first to third compression data Y1, Y2, and F of the first compression data group GC#1 in the memory 142. In response to the select signal '01', the selecting unit 141H stores the first to third compression data Y1, Y2, and F of the second compression data group GC#2 in the memory 142. In response to the selected signal '10', the selecting unit 141H stores the first to third compression data Y1, y2, and F of the third compression data group GC#3 in the memory 142. In response to the select signal '11', the selecting unit 141H stores the first to third compression data Y1, Y2, and F of the fourth compression data group GC#4 in the memory 142.

Figure 16:
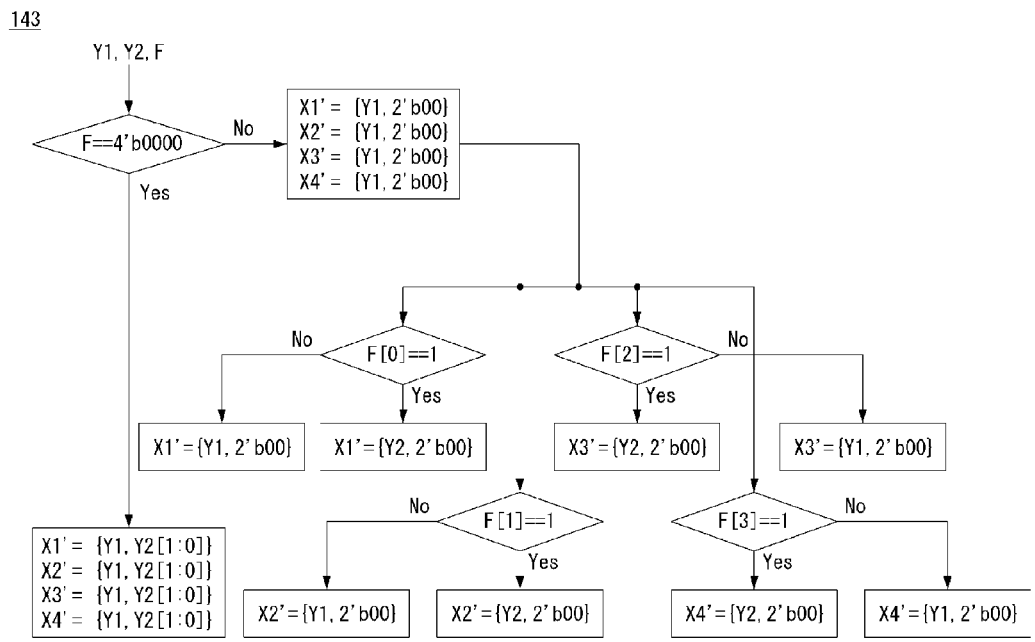
FIG. 16 is a view illustrating an operation of a restoration unit of FIG. 5.

FIG. 16 is a view illustrating an operation of the restoration unit 143 of FIG. 5.

Referring to FIG. 16, the restoration unit 143 restores the 6-bit first and second compression data Y1 and 2 and the 4-bit third compression data F stored in the memory 142 into 8-bit first to fourth restoration data X1'~X4' differently according to the presence and absence of an outlier and an outlier derivation position.

When the 4-bit third compression data F is '0000', the restoration unit 143 determines that there is no outlier, and restores the first to fourth restoration data X1'~X4' with the same value. Namely, the restoration unit 143 uniformly allocates the 6-bit first compression data Y1 to most significant 6 bits of the 8-bit first to fourth restoration data X1'~X4', respectively, and least significant 2 bits of the second compression data Y2 to least significant 2 bits of the 8-bit first to fourth restoration data X1'~X4', respectively.

When the 4-bit third compression data F is not '0000', the restoration unit 143 determines that there is an outlier, and restores data corresponding to the position of the outlier in the first to fourth restoration data X1'~X4' to a different value from other data. When the 4-bit third compression data F is not '0000', the restoration unit 143 fills the most significant 6 bits of each of the 8-bit first to fourth restoration data X1'~X4' with the 6-bit first compression Y1 uniformly, and fills the least significant 2 bits of each of the 8-bit first to fourth restoration data X1'~X4' with '00' uniformly. In this state, the restoration unit 143 determines which bit of the 4-bit third compression data F is '1'. F[0] is a flag for deriving the first restoration data X1', which corresponds to the first bit of the 4-bit third compression data F. F[1] is a flag for deriving the second restoration data X2', which corresponds to the second bit of the 4-bit third compression data F. F[2] is a flag for deriving the third restoration data X3', which corresponds to the third bit of the 4-bit third compression data F. F[3] is a flag for deriving the fourth restoration data X4', which corresponds to the fourth bit of the 4-bit third compression data F. Based on the bit values of the flag bits, the restoration unit 143 substitutes the most significant 6-bit data of the restoration data corresponding to an outlier of the 8-bit first to fourth restoration data X1'~X4' with the 6-bit second compression data Y2.

In other words, when F[0] is '1', the restoration unit 143 replaces the first restoration data X1' from the first compression data Y1 to the second compression data Y2, and when F[0] is '0', the restoration unit 143 maintains the first restoration data X1' as the first compression data Y1. When F[1] is '1', the restoration unit 143 replaces the second restoration data X2' from the first compression data Y1 to the second compression data Y2, and when F[1] is '0', the restoration unit 143 maintains the second restoration data X2' as the first compression data Y1. When F[2] is '1', the restoration unit 143 replaces the third restoration data X3' from the first compression data Y1 to the second compression data Y2, and when F[2] is '0', the restoration unit 143 maintains the third restoration data X3' as the first compression data Y1. When F[3] is '1', the restoration unit 143 replaces the fourth restoration data X4' from the first compression data Y1 to the second compression data Y2, and when F[3] is '0', the restoration unit 143 maintains the fourth restoration data X4' as the first compression data Y1.

As described above, in the memory reduction device of a stereoscopic image display according to embodiments of the present invention, since video data required for compensating for 3D crosstalk is compressed in advance and stored in the memory, a capacity of the memory required for crosstalk compensation can be drastically reduced.

While the present invention has been shown and described in connection with the embodiments, it will be apparent to those skilled in the art that modifications and variations can be made without departing from the spirit and scope of the invention as defined by the appended claims.

What is claimed is:

1. A memory reduction device of a stereoscopic image display for compensating for 3D crosstalk by comparing Gn and Gn−1 to be displayed to be adjacent to each other and modulating Gn into Gn', the memory reduction device comprising:

a memory; and a compression unit configured to receive first to fourth input data belonging to Gn and comprised of K1 bits, respectively, align the first to fourth input data in order of a data size to generate first to fourth alignment data, generate first to fourth compression data groups including first and second compression data having K2 bits smaller than the K1 bits and third compression data having K3 bits smaller than the K2 bits based on the first to fourth alignment data, derive an outlier from the first to fourth input data by using a deviation between the first to fourth alignment data, select any one of the first to fourth compression data groups, as a compressed Gn−1 according to the presence or absence of the outlier and an outlier derivation position, and store the same in the memory, wherein each of K1, K2 and K3 is a positive integer, and wherein Gn is any one of left eye data and right eye data, indicating frame (or line data) of a 3D image to be displayed in an nth frame (or nth horizontal pixel line), and Gn−1 is the other of the left eye data and the right eye data, indicating frame (or line) data of a 3D image to be displayed in a (n−1)th frame (or (n−1)th horizontal pixel line).

2. The memory reduction device of claim 1, wherein the third compression data indicates the presence and absence of an outlier and a position of data corresponding to the outlier, and the number of bits of the third compression data is set to correspond to the number of input data also considered for compression.

3. The memory reduction device of claim 1, further comprising:
a restoration unit configured to receive a compression data group from the memory, and restores the compression data group into first to fourth restoration data belonging to the Gn−1 and comprised of the K1 bits according to the presence and absence of an outlier and the outlier derivation position.

4. The memory reduction device of claim 3, wherein the K1 bits are selected as 8 bits, the K2 bits are selected as 6 bits, and the K3 bits are selected as 4 bits.

5. The memory reduction device of claim 4, wherein the compressor comprises:
an aligning unit configured to add 2-bit position information to the 8-bit first to fourth input data and aligning them in order of a data size to generate 10-bit first to fourth alignment data;
a first group generating unit configured to generate a first compression data group including 6-bit first compression data, 6-bit second compression data, and 4-bit third compression data without an outlier based on the 10-bit first to fourth alignment data;
a second group generating unit configured to generate a second compression data group including 6-bit first compression data, 6-bit second compression data, and 4-bit third compression data and having an outlier at a first position based on the 10-bit first to fourth alignment data;
a third group generating unit configured to generate a second compression data group including 6-bit first compression data, 6-bit second compression data, and 4-bit third compression data and having an outlier at a second position based on the 10-bit first to fourth alignment data; and
a fourth group generating unit configured to generate a second compression data group including 6-bit first compression data, 6-bit second compression data, and 4-bit third compression data and having an outlier at a third position based on the 10-bit first to fourth alignment data.

6. The memory reduction device of claim 5, wherein the first group generating unit averages 8-bit first to fourth corrected alignment data obtained by removing least significant 2 bits from 10-bit first to fourth alignment data to calculate 8-bit first average data, allocates the most significant 6 bits of the 8-bit first average data to the first compression data of the first compression data group, allocates the least significant 2 bits of the 8-bit first average data to least significant 2 bits of the second compression data belonging to the first compression data group, and allocates '0000' to most significant 4 bits of second compression data belonging to the first compression data group and the 4-bit third compression data belonging to the first compression data group.

7. The memory reduction device of claim 5, wherein the second group generating unit generates 8-bit first to fourth corrected alignment data by removing least significant 2 bits from the 10-bit first to fourth alignment data, averages the 8-bit first to third corrected alignment data to calculate 8-bit second average data, allocates most significant 6 bits of the 8-bit second average data to the first compression data of the second compression data group, allocates most significant 6 bits of the 8-bit fourth corrected alignment data to the second compression data of the second compression data group, and allocates any one of '0001', '0010', '0100', and '1000' to the third compression data of the second compression data group according to which of the 8-bit first to fourth input data the 8-bit fourth corrected alignment data corresponds to.

8. The memory reduction device of claim 5 wherein the third group generating unit generates 8-bit first to fourth corrected alignment data by removing least significant 2 bits from the 10-bit first to fourth alignment data, averages the 8-bit third and fourth corrected alignment data to calculate 8-bit 3a-th average data, allocates most significant 6 bits of the 8-bit 3a-th average data to the first compression data of the third compression data group, averages the 8-bit first and second corrected alignment data to calculate 8-bit 3b-th average data, allocates most significant 6 bits of the 8-bit 3b-th average data to the second compression data of the third compression data group, selects two different ones among '0001', '0010', '0100', and '1000' according to which of the 8-bit first to fourth input data the 8-bit first and second corrected alignment data corresponds to, and adds the selected two different ones and allocates the sum to the third compression data of the third compression data group.

9. The memory reduction device of claim 5, wherein the fourth group generating unit generates 8-bit first to fourth corrected alignment data by removing least significant 2 bits from the 10-bit first to fourth alignment data, averages the 8-bit second to fourth corrected alignment data to calculate 8-bit fourth average data, allocates most significant 6 bits of the 8-bit fourth average data to the first compression data of the fourth compression data group, allocates most significant 6 bits of the 8-bit first corrected alignment data to the second compression data of the fourth compression data group, and allocates any one of '0001', '0010', '0100', and '1000' to the third compression data of the fourth compression data group according to which of the 8-bit first to fourth input data the 8-bit first corrected alignment data corresponds to.

10. The memory reduction device of claim 4, wherein the compression unit comprises:
a deviation deriving unit configured to calculate a maximum deviation and first to third deviations through arithmetic operation on the 10-bit first to fourth alignment data;
a select signal generating unit configured to derive an outlier from the first to fourth alignment data by using the deviations, and differently output a select signal according to the presence and absence of the outlier and the outlier derivation position; and
a selecting unit configured to select any one of the first to fourth compression data groups according to the select signal and store the same in the memory.

11. The memory reduction device of claim 10, wherein when the maximum deviation is smaller than a predetermined threshold value, the select signal generating unit determines that there is no outlier, and outputs a select signal '00';
when the first deviation, among the first to third deviations, is the greatest in a state in which the maximum deviation is greater than the predetermined threshold value, the select signal generating unit determines that the fourth alignment data is an outlier, and outputs a select signal '01';
when the second deviation, among the first to third deviations, is the greatest in a state in which the maximum deviation is greater than the predetermined threshold value, the select signal generating unit determines that the first alignment data and the second alignment data are outliers, and outputs a select signal '10'; and
when the third deviation, among the first to third deviations, is the greatest in a state in which the maximum deviation is greater than the predetermined threshold value, the select signal generating unit determines that the first alignment data is an outlier, and outputs a select signal '11'.

* * * * *